April 17, 1956  F. J. VOELKERDING  2,742,266
GAS OR LIQUID LINE LEAK DETECTOR PROBE
Filed March 27, 1953
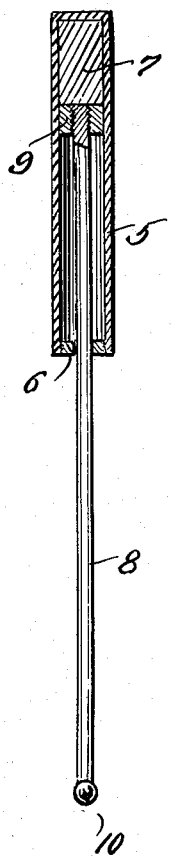
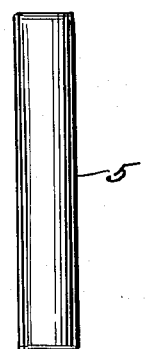
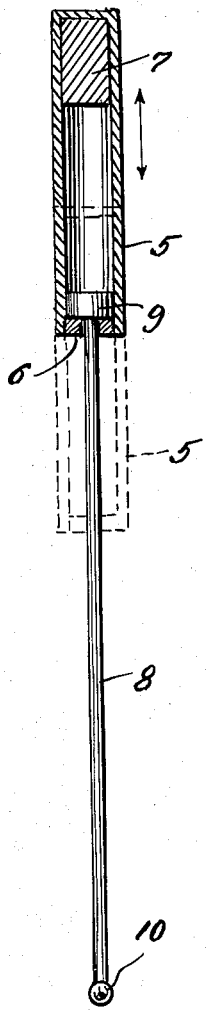
INVENTOR.
FRANK J. VOELKERDING
BY Patrick D Beavers
ATTORNEY

# United States Patent Office 2,742,266
Patented Apr. 17, 1956

2,742,266
GAS OR LIQUID LINE LEAK DETECTOR PROBE
Frank J. Voelkerding, Lake City, Iowa Application March 27, 1953, Serial No. 345,046

1 Claim. (Cl. 255—10)

The present invention relates to improvements in means for detecting leaks in gas or liquid pipe lines.

The principal object of the invention is to provide a safe probe which can be conveniently used by a person working to detect leaks in pipe lines.

Another object of the invention is to provide a leak detecting probe which can be easily driven into the ground to various depths and to the end that upon removal of the probe, an igniter or leak detecting instrument may be used at the opening formed by the probe.

Still another object of the invention is to provide a a safely usable leak detecting probe, which is of extremely simple construction, positive acting and not susceptible to the ready development of defects.

These and other objects and advantages of the invention will become apparent to the reader of the following description.

In the drawing:

Figure 1 is a side elevational view of the probe, shown partly inserted into the ground and in broken lines shown fully inserted.

Figure 2 is a longitudinal sectional view through the probe showing the probe rod in retracted position.

Figure 3 is a longitudinal sectional view through the probe showing the probe rod in extended position and further showing by broken lines the position of the barrel when moved to a striking position.

Referring to the drawing wherein like numerals designate like parts, it can be seen that the probe includes a barrel 5 of some suitable metal, the lower end of which is open, but contains an apertured collar 6, which is preferably welded in position, as shown in Figure 2.

Within the upper closed end of the barrel 5 is a hammer body 7 and the upper end of the barrel may be sweated, spot welded or otherwise fastened in such a manner to the hammer body 7 so that the same will not become displaced and will remain in this part of the barrel.

Numeral 8 denotes an elongated probe rod, slideably disposed through the collar 6 and having its upper end provided with an anvil 9 for sliding disposition within the barrel 5 and against the inner side thereof. The probe rod 8 is freely slideable through the collar 6 at the lower end of the barrel 5 and its lower end is provided with a small head 10 which may be a spherical, a square or of any other desired form. The probe rod 8 is preferably of hard steel and may be either round or of some polygonal shape in cross section.

It is obvious that this instrument may be used for other purposes than that of detecting leaks.

In the use and operation of this instrument, the probe rod 8 is first inserted into the ground as shown in Figure 1. This makes the rod substantially stationary and standing vertically, after which the barrel 5 is lifted on the upper end of the rod 8 and then forced downwardly with sufficient force to drive the head of the rod 8 into the ground. This operation is repeated over and over until the rod has descended to the desired depth, where, if there is a leak in an adjacent pipe, fumes will enter the bore formed by the rod 8. The rod 8 is removed and either an igniter placed at the mouth of the opening, or else suction means for effecting entrance of gas contained in the bore into a gas detecting instrument (not shown).

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

A probe comprising a hollow cylindrical barrel having a closed end and an open end, a hammer body affixed in said barrel adjacent the closed end thereof, an apertured collar affixed within said barrel at the open end thereof, a rod slidably mounted in said collar, an anvil affixed to the inner end of said rod and slidably contacting the inner side of said barrel, and a substantially spherical head formed integrally with the outer end of said rod.

References Cited in the file of this patent
UNITED STATES PATENTS

| | | |
|---|---|---|
| 634,687 | Hartenfels | Oct. 10, 1899 |
| 1,521,265 | Anderson | Dec. 30, 1924 |
| 2,272,355 | Schnell | Feb. 10, 1942 |
| 2,574,605 | Van Pelt | Nov. 13, 1951 |
| 2,619,832 | Vermeiden | Dec. 2, 1952 |